United States Patent [19]
Kouklik

[11] 3,969,912
[45] July 20, 1976

[54] PATTERNING MEMORY FOR CIRCULAR KNITTING MACHINE

[75] Inventor: Ivo Kouklik, Trebic, Czechoslovakia

[73] Assignee: Elitex, Zavody textilniho strojirenstvi generalni reditelstvi, Liberec, Czechoslovakia

[22] Filed: July 8, 1974

[21] Appl. No.: 486,322

[30] Foreign Application Priority Data
July 12, 1973    Czechoslovakia .................. 5009-73

[52] U.S. Cl. ............................ 66/154 A; 235/151.1
[51] Int. Cl.² ......................................... D04B 15/66
[58] Field of Search ................ 340/173 SP, 174 SP; 66/25, 50 R, 50 B, 75, 154 A; 235/151.1

[56]            References Cited
            UNITED STATES PATENTS

| 3,828,583 | 8/1974 | Hamma | 66/50 R |
| 3,831,402 | 8/1974 | Schuman | 66/50 R |
| 3,844,139 | 10/1974 | De Cerjat et al. | 66/50 R |
| 3,879,963 | 4/1975 | Grozinger | 66/50 R |
| 3,890,806 | 6/1975 | Grozinger | 66/50 R |

FOREIGN PATENTS OR APPLICATIONS

| 135,196 | 2/1970 | Czechoslovakia | 66/50 R |
| 2,007,515 | 9/1970 | Germany | 66/50 R |
| 1,165,368 | 9/1969 | United Kingdom | 66/154 A |
| 1,324,426 | 7/1973 | United Kingdom | 66/50 R |

OTHER PUBLICATIONS
Electronics, Sept. 28, 1970, pp. 56–60.

Primary Examiner—Mervin Stein
Assistant Examiner—Andrew M. Falik
Attorney, Agent, or Firm—Murray Schaffer

[57]            ABSTRACT

A circular knitting machine having a patterning means with finite means for storage of a knitting pattern less than the number of needles, and means for controlling the knitting needles in response thereto. Counters for determining the passage of the needles and of the courses of the knitwork from an initial point and a decoder interposed between each counter and the input of the patterning memory to reduce the output of the counters to the capacity of the patterning memory.

5 Claims, 4 Drawing Figures

PATTERNING MEMORY FOR CIRCULAR KNITTING MACHINE

RELATED APPLICATION

The present invention is related to applicant's copending application Ser. No. 486,321 filed on even date herewith to which reference can be made for its disclosure.

BACKGROUND OF THE INVENTION

The present invention relates to pattern control systems for circular knitting machines and in particular to a method and apparatus for the improved reading of the patterning memory therefor, in correspondence to the needle and course passage.

Conventionally constructed circular knitting machines of both the one and two cylinder type have in recent years been provided with "electronic" patterning control systems. Briefly in such machines, the needles are selectively movable between a rest or inoperative position and between a knitting position by operation of a selector jack, spring or clavette in response to a pulse input on a solenoid or similar electromagnetic mechanism. The signal or pulse is derived from a pattern control device having a memory, such as tape, punch card, or core matrix, in which the overall knitting pattern is stored and circuit, computer and logic means to correlate the pattern relative to each needle at each course and wale loop intersection.

Reference can be made for general information regarding several systems to the publication Electronics in Knitting, Charles Reichman, ed. Am. Soc. of Knitting Technologists and The National Knitted Outerwear Assoc. 1972, and for more specific information to the copending applications Ser. No. 342,941, filed Mar. 20, 1973 pending.
Ser. No. 246,623, filed Apr. 24, 1972 now abandoned.
Ser. No. 246,792, filed Apr. 24, 1972 and now abandoned.
Ser. No. 246,791, filed Apr. 24, 1972 now U.S. Pat. No. 3,874,198
Ser. No. 246,699, filed Apr. 24, 1972 and now abandoned.

In small diameter knitting machines equipped with electronic patterning systems it is customary to employ a memory having a smaller finite capacity (i.e. storage bits, memory cores, logic terminals) than the number of needles in the cylinder of the knitting machine and the number of patterned courses in the finished knitwork. This is possible, since the patterns used are of small overall extent and may be repeated several times about the circumference and along the length of the knitwork. Such systems are equipped with shift and/or reversible registers which determine or read the address, (i.e. the position, in terms of course and wale of the knitwork) of the patterning memory. Such registers have an adjustable length computing cycle so as to also enable the reduction enlargement of the dimensions of the design of the pattern and are reversible for the purpose of enabling the knitting of mirror-image designs.

A disadvantage of employing registers for the reading of the memory lies in the fact that regular shift of the register predetermines the reading of both the wale and the course of the memory pattern to a system of successive reading. Thus all of the various possibilities inherent in the capacity of the memory of the associated computer can not be utilized. Furthermore, should one pattern memory be employed to control a plurality of knitting machines, then each machine must be provided with reversible shift registers each having an individually adjustable computing length. As a result the systems employing shift registers are relatively complicated and expensive.

It is an object of the present invention to provide an improved method and apparatus for reading patterning memories for knitting machines in which the cost and complexity of the systems is greatly reduced.

These objects, as well as other objects and advantages of the present invention will be apparent from the following disclosure.

SUMMARY OF THE INVENTION

According to the present invention the reading of the patterning memory for circular knitting machines is accomplished by interposing decoders, having a preadjusted program between unidirectional counters connected to the wale and course lines of the memory determining the movement of the needles and the formation of the knitted loop courses.

The counters, according to the present invention may have a capacity corresponding to the entire number of needles and courses, while the decoders function to reduce the number of counted signals to the capacity of the patterning memory employed.

Full details of the present invention are set forth in the following description and illustrated in the accompanying drawings.

DESCRIPTION OF THE INVENTION

The present invention is applied to a circular knitting machine of conventional construction having 160 needles in its cylinder (for illustration) and one provided with patterning memory system of a structure described in Czechoslovak Pat. No. 135,196 or in the aforementioned U.S. Patent Applications.

The knitting machine is provided with a disc mounted to rotate jointly in conjunction with the rotation of the needle cylinder. The disc is provided with a plurality of holes uniformly spaced about its circumference corresponding to the number of needles mounted in the cylinder plus one additional hole radially offset therefrom. Mounted in conjunction with one side of the disc is a light source and in conjunction with the other side two photoelectric cells. The first photo-electric cell (indicated in FIG. 1 by the numeral 1) is arranged to pick up the light pulses passing through the plurality of circumferential holes corresponding to the needles. The second photo cell (indicated in FIG. 2 by the numeral 2) is arranged to sense the light pulse passing through the one additional hole, and thus indicates a full revolution of the disc and consequently the passage of the needle cylinder through a single course.

Figure 1:
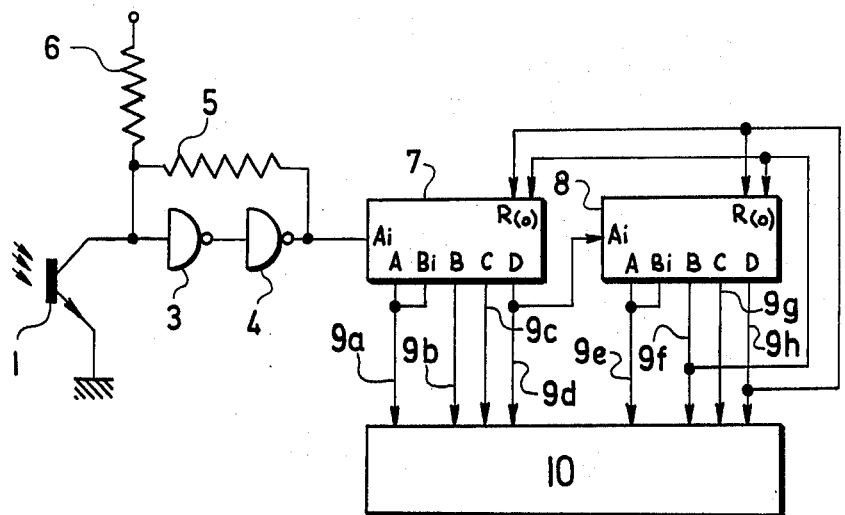
FIG. 1 is a schematic diagram of the arrangement of needle counter, decoder and patterning memory.

As seen in FIG. 1, the photo-cell 1 is connected to a bistable trigger circuit comprising inverters 3 and 4 (as for example one half of the circuit type SN 7 400) and resistors 5 and 6 in which the signal from the photo cell 1 is shaped to a square or rectangular wave pulse. Suitable connection to a source of voltage, as by connecting the resistor 6 to the positive pole can be made.

The bistable trigger circuit is connected to a decimal binary counter by which the pulse signals from the photocell are counted to indicate the passage of the needles. The counter is of the SN 7493 type able to record 16 × 16 various binary digits. The needle counter comprises a pair of identical circuits 7 and 8 having plural outputs (4× 4 binary or 16 × 16 decimal) 9a to 9h having a total capacity of 256. The terminals A-D of outputs 9a to 9h are arranged, however, in a manner so as to count only up to 160, corresponding to the number of needles in the illustrated needle cylinder. The shortening of the computing cycle of counter circuits 7 and 8 is obtained by connecting the requisite output lines 9f and 9h to the zeroing inputs $R_{(o)}$. Ai and Bi denote inputs of the circuits 7 and 8 while A, B, C, D denote the outputs.

The eight order operand output lines 9a to 9h are connected to a decoder 10 having output lines 11a to 11e which are connected to the wale line of the patterning memory 12, of the type described in the aforementioned Czechoslovak Pat. No. 135,196.

Figure 2:
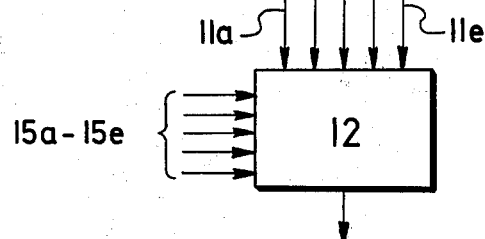
FIG. 2 is a schematic diagram of the course counter.

As seen in FIG. 2 the second photo cell 2 is also connected to a second bistable trigger circuit which is identical to that used with the first photo-cell. The second bistable trigger circuit is provided to a decimal binary course counter comprising circuits 13 and 14 which are also identical to counter circuits 7 and 8, except that their zeroing contacts $R_{(o)}$ are connected to a microswitch 15. The microswitch 15 is adapted to be closed upon initial start-up of the knitting machine, consequently causing zeroing of the state of the course counter to be performed at that time, and provided a given initial reference point.

The output lines (not numbered) leading from outputs A-D of this second set of counter circuits 13 and 14 are likewise connected to a second decoder (not shown) of the same type as the aforementioned decoder 10. The output lines of this second decoder, indicated by the numerals 15a–15e are connected to the course lines of the patterning memory 12, seen in FIG. 1.

Figure 3:
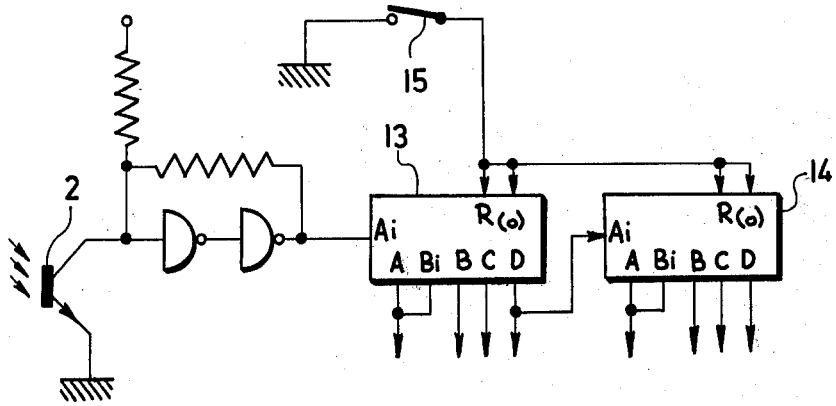
FIG. 3 is a circuit diagram of the permanent storage means of the decoder.
Figure 3:
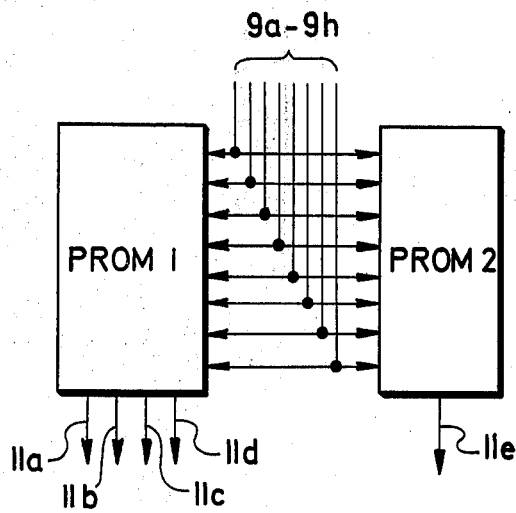

The decoder 10 (and the second decoder, not illustrated) are basicly reducing decoders and comprise a pair of permanently adjustable preprogrammable storage units or memories of PROM (permanent read only memory) type, which are made of semiconductors in integrated form, as indicated in FIG. 3, the decoder 10 comprises both a PROM 1 and PROM 2, both fed from inputs 9a to 9h. FIG. 3 shows PROM 1 having an organization of 256 × 5, arranged at 256 × 1 with four outputs and PROM 2, organized at 256 × 4 and only one output. In this manner the first storage unit PROM 1 transforms the binary eight order operand to a binary four order coded output digit indicated by output lines 11a – 11d, while the second storage unit PROM 2 transforms the eight order operand to a one order binary output digit indicated by output line 11e. Together the two PROM storage units provide a five order digit. Even though the memory PROM 2 has four outputs, only one of the outputs is used and three are not connected. From both memories, there is therefore eight outputs available, from which only five form the patterning memory to the extents of 32 × 32, as per the illustration. In an analogous manner, the circuits 13 and 14 of the second counter by which the courses of patterning memory 12 are read, is constructed to provide the outputs represented by lines 15a – 15e. The decoders 10 may also be constructed with re-programmable storage units of RMM (Read mostly memory) type, instead of ROM type illustrated.

Figure 4:
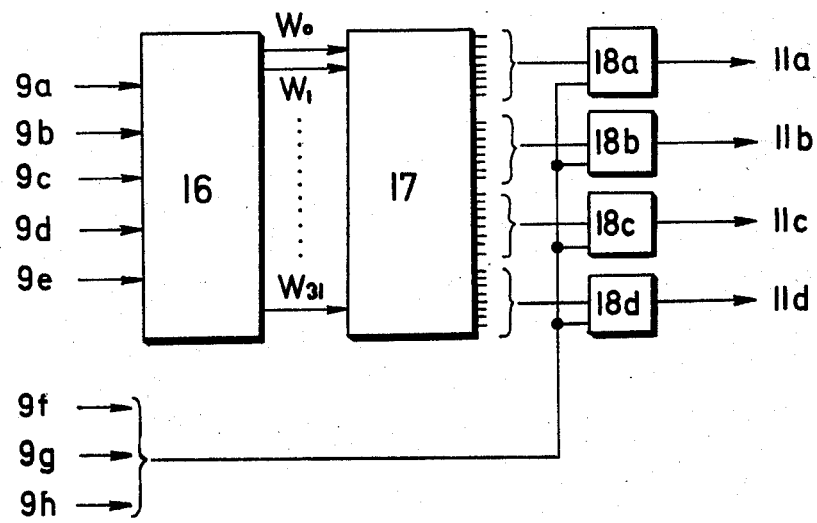
FIG. 4 is a diagram of the separate circuits of the memory unit, namely of a HPROM 1024 storage device.

A more detailed explanation of each of the storage units PROM 1 is given in connection with FIG. 4. The storage unit comprises an input decoder 16, a storage or memory matrix 17 having a 32 × 32 decimal extent, in which the program expressed by pattern on knitwork is permanently coded and output decoders 18a to 18d. The output lines 9a to 9e (for example) are connected to the input decoder 16 which has 32 outputs $W_o - W_{31}$ connected to the matrix 17. The outputs 9f to 9h are connected directly from circuit 8 to the output decoders 18a – 18d. The decoders 18a – 18d provide the outputs 11a – 18d. Both decoders 18a – 18d and decoder 16 are formed of a unit integral with the storage and memory matrix 17 and serve one of the eight outputs of each section of the matrix 17. In this manner decoder 16 distributes a coded binary number from the inputs 9a – 9e to one of the 32 outputs $W_o - W_{31}$ while decoder 18 distributed the outputs of its own memory matrix 17.

The system described above operates as follows:

Upon starting the knitting machine, the microswitch 15 is closed and the course counter (FIG. 2) is brought to its zero position. The needle cylinder rotates, causing the disc (not illustrated) to also rotate generating in the photo cells 1 and 2 a series of appropriate signals. The signals are each respectively shaped in the bistable trigger circuits into square wave pulses having sharp or fast leading edges.

The needle counter circuits 7 and 8 count the number of pulses from the photocell 1 and record at its output lines 9a – 9h an eight order operand, which is transmitted to both the storage units PROM 1 and PROM 2 of the decoder 10. The higher digit orders are recorded in the unit PROM 1. The information goes to decoder 16 through lines 9a to 9e and are decoded there to a single output transmitted on one of the output lines $W_o$ to $W_{31}$. The single output signal $W_o$ to $W_{31}$ is fed to matrix 17 from which it is led through the respective one of the 32 storage cores and the correspondingly grouped outputs into one of the four decoders 18a to 18d. From these decoders 18a to 18d four output signals are chosen in dependence upon the higher digit orders or the information respectively contained in needle counter output lines 9f to 9h. The chosen signals are then fed through lines 11a to 11d into patterning memory 12. Similarly, the signal in line 11e is obtained from the storage unit PROM 2.

In the same manner, the course position of the knitwork is obtained by rotation of the disc and a signal is produced in the photo-cell 2, which is converted by the second decoder (10) etc. into output signals on line 15a to 15e.

The single output line of the patterning memory transmits a signal pulse generated by converging wale signals 11a – 11e and course signals 15 – 15e which is then transmitted to the appropriate operational solenoid or electromagnet for moving the selected needles into the rest or knitting position.

The actual advantage of reading the patterning memory 12 by means of the decoders described, utilizing permanently adjustable storage units, appears significantly in the group control of several knitting machines. Counters from a plurality of machines can be connected to the input line of the decoders and can be successively placed into operation by means of selective change-over switches in the manner described in copending U.S. application Ser. No. 486,321, filed on even date herewith. A further advantage is clearly seen in that the counter can be provided with a capacity equal to the number of needles and courses, so that the exact position of the knitwork can be ascertained, while the decoders are employed to reduce the output of the counters to the actual capacity of the patterning memory, which may be similar, and less complex than heretofore.

In the foregoing description reference has been made to various circuits and components. Circuits SN 7400, 7403, 7493 and PROM 1 and 2 are products of the Texas Instruments Comp., Houston, Tex. Similar circuits are also manufactured by Fairchild Semiconductor Comp., 464 Ellis St., Mountain View, Calif., 94040. In the catalog of the Fairchild Semiconductor Co. of June 1972 there is a comparison between the circuits of Texas Instrument and Fairchild. Circuit 7400 is equivalent to Fairchild Circuit 9N00, SN 7403 to 9N03 and 7493 to 9393. PROM is indicated in the catalogue by 93406 and all circuits are fully described in the said catalogues. Details of these circuits can be found in, and reference is made to the above publications which are incorporated herein, as if more fully set forth.

Various changes, modifications and embodiments have been suggested in the foregoing description, others will be obvious to those skilled in the art. It is intended therefore that the present disclosure be taken as illustrative only and not as limiting of the present invention.

What is claimed:

1. In a circular knitting machine having a plurality of needles operable to knit yarn into a plurality of loops in wales and courses, a patterning memory having means for the storage of a knitting pattern and an output for the control of the needles with respect thereto derived from an input based upon the position of the needles and the particular course of the knitwork, the improvement for reading said patterning memory comprising means for counting the passage of both said needles and said courses from an initial point, said counters having a capacity to read the total number of needles and the total course passage from said initial point and said patterning memory having a capacity significantly smaller than said total number of needles and the total course passage, and a decoder interposed between each of said counters and said inputs of said patterning memory to reduce the output of said counters to the capacity of said patterning memory.

2. The improvement according to claim 1 wherein the decoder is a programmable storage unit of the ROM type.

3. The improvement according to claim 1 wherein the decoder is a reprogrammable storage unit of the RMM type.

4. The improvement according to claim 1 wherein a plurality of knitting machines are each provided with needle and course counters connected respectively to common decoders, and switch means are interposed between each of said counters and said decoders to provide successive operation.

5. The method of reading a patterning memory having a capacity substantially less than the total number of needles and the total course passage of a circular knitting machine comprising utilizing unidirectional counters counting the passage of the needles and the knitted loop courses past a given initial point, said counters having a capacity to read the total number of needles and the total course passage, said counters being connected by means of a decoder reducing the output of the counters to the wale and course lines of said patterning memory, so that the separate wales and courses of the patterning memory are read according to the preadjusted program of said patterning memory.

* * * * *